2,945,787

GLUTAMIC ACID SYNTHESIS

Robert C. Good and Oscar L. Norman, Northbrook, Ill., assignors to International Minerals & Chemical Corporation, a corporation of New York No Drawing. Filed June 27, 1957, Ser. No. 668,296

11 Claims. (Cl. 195—47)

This invention is concerned with the synthesis of alpha-amino carboxylic acids, and more particularly with the preparation of L-glutamic acid from alpha-hydroxyglutaric acid compounds through biological means.

L-glutamic acid is widely used in the form of monosodium L-glutamate as a flavor-intensifying agent for a variety of foods. The material is obtained almost entirely from natural sources, e.g., proteins and sugar beet waste liquors. Numerous attempts have been made over the years to synthesize L-glutamic acid by chemical means, but such processes have uniformly produced the racemic mixture, DL-glutamic acid, which necessitates a difficult and expensive resolution step. Biological conversions have also been attempted, starting with alpha-ketoglutaric acid, and using yeasts or related organisms to effectuate enzymatic conversion to glutamic acid. Such processes have the advantage of producting only the L-enantiomorph, but the starting material is scarce and expensive.

We have now discovered a technique whereby L-alpha-hydroxyglutarate and its precursor compounds can readily be converted into L-glutamic acid. Inasmuch as alpha-hydroxyglutaric acid is conveniently prepared by synthetic means, our new process represents a distinct improvement in the synthetic production of L-glutamic acid.

An object of our invention is to provide an improved process for preparing L-glutamic acid.

Another object is to prepare L-glutamic acid by biological means.

Another object is to convert L-alpha-hydroxyglutarate and its precursor compounds into L-glutamic acid.

Another object is to provide a commercially practicable method for the biological preparation of L-glutamic acid.

We have now discovered that L-glutamic acid can readily be prepared from L-alpha-hydroxyglutarate by aerobic fermentation of the latter in the presence of a nitrogen source and a biological catalytic system produced by microorganisms of the genera Pseudomonas or Aeromonas, the fermentation being carried out at a temperature at least about 5° C. above the optimum growth temperature of the organism, and preferably at least about 10° C. above said temperature. For most species, the fermentation can satisfactorily be carried out at a temperature between about 40 and about 60° C., preferably between about 40 and about 50° C. The conversion is suitably carried out in a medium containing L-alpha-hydroxyglutarate as the sole or predominating utilizable carbon source at a concentration between about 0.1 and about 10% by weight, preferably between about 0.4 and about 4% by weight, and at a pH between about 6 and about 9, preferably between about 7 and about 8. Either the organisms themselves can be employed or an extract thereof containing the active catalytic material, prepared by mechanical maceration, treatment with ultrasonic waves, or according to other techniques known to the art. The proportion of active cells is not critical, but for highest and most economical conversions it should lie between about 1 and about 3 parts by weight per part of L-alpha-hydroxyglutarate in the medium, or an extract equivalent thereto. Contact with air is suitably made by shaking, stirring, sparging, or the like. The conversion will ordinarily reach a maximum in a period of about 5 to about 25 hours. The glutamic acid product is readily recovered from the treated medium in a known manner—e.g., by filtering off the organisms, concentrating to a dry solids content of about 60 to about 85% by weight, filtering off the precipitated solids, acidifying to around pH 3.2, and crystallizing L-glutamic acid therefrom.

We have found that two groups of organisms are suitable for converting alpha-hydroxyglutaric acid compounds into L-glutamic acid in accordance with our invention. The two groups are the Pseudomonads, which are aerobic, and the related Aeromonads, which are falcutative aerobes and gas formers. Both groups of organisms are non-sport-forming, gram-negative rods, both occur widely in the soil, and both have the unusual power to grow in a medium containing alpha-hydroxyglutarate as the sole carbon source. Among the Pseudomonads which can be used in our invention are *Pseudomonas fluorescens*, *Pseudomonas fairmountensis*, and *Pseudomonas hydrophila*. The Aeromonads were proposed as a genus by Kluyver and Van Neil, Zeit. fuer Bakt., II, 94, 369–403, (1936), but the classification of the various species thereof is not well advanced. We have isolated and successfully employed at least four different species of Aeromonads, the organisms differing primarily only in pigmentation. Cultures of the said species have been deposited with the American Type Culture Collection, 2112 M Street NW, Washington 7, D.C. under accession numbers ATCC 13560–13563, inclusive.

The organisms employed in our invention may be grown in virtually any of the common types of nutrient media, employing glucose, for example, as the carbon source. It is advantageous, however, to incorporate L-alpha-hydroxyglutarate in the medium at least during the latter stages of growth in order to effect a substantial activation of the organisms for the desired conversion. A suitable medium can be prepared from the following stock solutions:

Solution A:
  $KH_2PO_4$ ----------------------------------g-- 6.805
  $Na_2HPO_4 \cdot 7H_2O$ ---------------------g-- 13.41
  Water ---------------------------------------ml.-- 790
Solution B:
  $NH_4Cl$ ------------------------------------g-- 30
  Yeast extract -------------------------------mg-- 50
  $MgSO_4 \cdot 7H_2O$ ------------------------g-- 20
  $CaCl_2$ ------------------------------------mg-- 100
  $FeSO_4 \cdot 7H_2O$ ------------------------mg-- 5
  Water ---------------------------------------ml-- 100
Solution C:
  An aqueous solution containing 5.0 g. (2.5% by wt.) of DL-alpha-hydroxyglutaric acid values (calculated as the lactone) is adjusted to pH 11.5 with aqueous 40% sodium hydroxide solution, then adjusted to pH 6.7 with 1 M hydrochloric acid, and made up to 200 ml. with water. The result is a 2.85% by weight solution of DL-alpha-hydroxyglutaric acid.

All of the solutions are autoclaved. Solutions A and C are mixed with 10 ml. of solution B, yielding a mixture which we have designated for convenience as "S-2M Medium." The completed medium is inoculated with 1% by volume of a 24-hour culture of the desired organism, and is then aerobically incubated 12 hours at 30° C. One hour before harvesting, an additional 50-ml. portion of solution C is added. At the end of the incubation, the cells are separated by centrifuging, and are resuspended in 0.05 M phosphate buffer or 0.89% physiological saline solution. The suspension contains the organisms in an active form, ready for large scale conversion of alpha-hydroxyglutarate.

DL-alpha-hydroxyglutaric acid is readily prepared by the method of Purvis, described in copending application Serial No. 599,356, filed July 23, 1956. In the Purvis method, 3-chlorocyclopentene is subjected to ozonization at low temperature, preferably around 0 to $-10°$ C., with a dilute stream of ozone in air or oxygen, and the resulting ozonization product is oxidized by treatment at ordinary or somewhat elevated temperatures with hydrogen peroxide, preferably at least about 30% $H_2O_2$, and in a molar ratio to ozonide of at least about 3:1. The resulting product contains DL-alpha-hydroxyglutaric acid, DL-alpha-hydroxyglutaric acid lactone, and DL-alpha-chloroglutaric acid, as well as water and organic solvent in which the reaction was carried out, together with ammonium salts resulting from pH adjustment. This mixture can be employed in our invention without substantial purification. We prefer to dilute it with water to a concentration of about 2.5% DL-alpha-hydroxyglutaric acid, calculated as the lactone, then adjust the pH to about 11 with aqueous 40% sodium hydroxide solution, allow to stand 15 minutes or so until the pH becomes stable (adjusting to pH 11 from the time to time as required), and finally adjusting to pH 7.5 with aqueous hydrochloric acid. The result is an aqueous solution containing the equivalent of 2.85% by weight of DL-alpha-hydroxyglutaric acid, having a pH of 7.5.

Our invention is applicable to the treatment of alpha-hydroxyglutarate and to substances ("precursors") affording alpha-hydroxyglutarate under the conversion conditions employed. Thus, alpha-hydroxyglutarate is produced from alpha-hydroxyglutaric acid lactone, from alpha-chloroglutaric acid, and from alpha-bromoglutaric acid in the aqueous fermentation media employed in our invention, and accordingly it is to be understood that our invention contemplates the treatment of such substances.

The terms "alpha-hydroxyglutarate," "alpha-chloroglutarate," and "alpha-bromoglutarate," as used herein, are intended to refer respectively to alpha-hydroxyglutaric acid, alpha-chloroglutaric acid, and alpha-bromoglutaric acid, and to the ammonium, alkali-metal, and alkaline-earth metal salts thereof. Similarly, "glutamate" is intended to refer to glutamic acid and to the ammonium, alkali-metal, and alkaline-earth metal salts thereof.

The term "fermentation" as used herein is intended to refer to a process in which organisms are employed to catalyze the conversion of a substrate into one or more desired products.

The medium for the conversion step of our process suitably contains water, a nitrogen source, alpha-hydroxyglutarate, active Pseudomonad or Aeromonad organisms, and optionally phosphate and a metallic ion enzyme activator. Such a medium may have the following composition:

| | Vol. percent |
|---|---|
| DL-alpha-hydroxyglutaric acid solution, 2.85% | 32 |
| $(NH_4)_2HPO_4$, 1 M, pH 7.5 | 10 |
| $MnSO_4$ solution, $10^{-3}$ M | 6 |
| Phosphate buffer, 0.05 M, pH 7.5 | 12 |
| Inoculum | 40 |

The inoculum, prepared as described above, contains about 25 to 50 mg./ml. of cells, dry weight, and the conversion medium contains about 5 to 10 mg./ml.

The nitrogen and the phosphate may conveniently be added in the form of ammonium phosphate. Alternatively, the phosphate may be added in the form of phosphoric acid or another phosphate salt and the nitrogen in the form of urea, ammonia, or another ammonium salt. For example, the phosphate may be added in the form of an alkali-metal phosphate such as sodium phosphate, and the nitrogen may be added in the form of ammonium chloride, ammonium sulfate, ammonium hydroxide, urea, or the like. The concentration of the nitrogen source in the medium should lie between about 100 and about 1000 micrograms per milliliter, calculated as $NH_4$, and preferably between about 200 and about 400 micrograms per milliliter, varying directly with the alpha-hydroxyglutarate concentration; and the concentration of phosphate may suitably be up to about 500 micrograms per milliliter, calculated as $PO_4$, preferably between about 10 and about 200 micrograms per milliliter.

The fermentation medium may optionally and advantageously contain a metallic ion enzyme activator. Various salts of bivalent metals may be used; for example, the simple salts of cobalt, zinc, magnesium, and ferrous iron. Manganous sulfate is a preferred activator. The activator, when used, is desirably present in a molar concentration between about $10^{-6}$ and about $10^{-2}$, based upon the total fermentation medium, preferably between about $10^{-4}$ and about $10^{-2}$.

The following specific examples will more clearly illustrate our invention.

*Example 1*

An Aeromonas isolate from soil, designated by us as Strain H-369, IMC B-4, and by the American Type Culture Collection as ATCC 13563, was grown in S-2M medium at pH 6.7 and harvested at the end of twelve hours. The harvested cells were washed on a centrifuge with water and phosphate buffer, then resuspended in phosphate buffer at pH 6.7. The suspension contained 26.25 mg. of cells, dry weight, per milliliter. The suspension was stored in a refrigerator for 3 hours, then used in the following series of tests.

In each test, a basal medium was made up from an aqueous solution containing 2.85 weight-% of synthetic DL-alpha-hydroxy-glutaric acid having a pH of 7.5. This material had been produced by ozonization of 3-chlorocyclopentene, followed by oxidation of the ozonization product with hydrogen peroxide. The basal medium had the following composition:

| | Ml. |
|---|---|
| DL-alpha-hydroxyglutaric acid solution, pH 7.5 | 4.0 |
| $(NH_4)_2HPO_4$ solution, 1 M | 1.25 |
| $MnSO_4$ solution, $10^{-3}$ M | 0.75 |
| Phosphate buffer, 0.05 M, pH 7.5 | 1.5 |
| H-369 cell suspension | 5.0 |
| | 12.5 |

Employing the above basal medium, the following series of tests were carried out:

Test—
(1) Basal medium, 37° C.
(2) Basal medium, 44° C.
(3) Basal medium plus $10^{-3}$ M arsenic, 37° C.
(4) Basal medium plus $10^{-3}$ M arsenic, 44° C.

In each test the completed medium, containing 10.5 mg. of dry cells per milliliter and 8.22 mg. of the hydroxy glutaric acid per milliliter, was placed in a 50-milliliter flask, stoppered lightly, and shaken in a water bath at the desired temperature. Samples were removed from time to time and analyzed for glutamic acid content. The results were as follows:

| Test No. | Medium | Temp., °C. | Incubation Time, hr. | pH | L-Glutamic Acid Found, mg./ml. | L-Glutamic Acid Synthesized, mg./ml. | Conversion[1] Percent |
|---|---|---|---|---|---|---|---|
| 1 | Basal | 37 | 0 | 7.0 | 0.12 | | |
| | | | 2 | | 0.22 | 0.10 | 1.2 |
| | | | 19 | | 0.47 | 0.35 | 4.3 |
| | | | 26 | 6.9 | 0.24 | 0.12 | 1.5 |
| 2 | Basal | 44 | 0 | 7.0 | 0.09 | | |
| | | | 2 | | 0.55 | 0.46 | 5.6 |
| | | | 19 | | 1.66 | 1.57 | 19.1 |
| | | | 26 | 7.0 | 1.88 | 1.79 | 21.8 |
| 3 | Basal+As | 37 | 0 | 7.0 | 0.0 | | |
| | | | 2 | | 0.32 | 0.32 | 3.9 |
| | | | 19 | | 1.01 | 1.01 | 12.3 |
| | | | 26 | 7.0 | 0.12 | 0.12 | 1.5 |
| 4 | Basal+As | 44 | 0 | 7.0 | 0.10 | | |
| | | | 2 | | 0.57 | 0.47 | 5.7 |
| | | | 19 | | 1.68 | 1.58 | 19.2 |
| | | | 26 | 6.9 | 1.80 | 1.70 | 20.7 |

[1] Based upon total DL-alpha-hydroxy glutarate values in the fermentation medium.

*Example 2*

Lyophilized *Pseudomonas fluorescens*, Strain B-6-bs, was activated by suspending a pellet of the stock in 10 milliliters of TGY medium (described by Haynes et al., Applied Microbiology, 3 (1955), 361-368 at 363). After standing for 30 minutes at room temperature, 2.5 milliliters of the suspension were inoculated into 125 milliliters of S-2M and incubated on a shaker for 28 hours at 30° C. A 30-milliliter portion of the resulting culture was used to inoculate a fermenter containing 3 liters of S-2M medium, after which the fermenter was held at 30° C. while being aerated with sterile air at a flow rate of 3.5 liters per minute. To control foaming, 0.5 ml. of a silicone antifoam agent was added. After 23.5 hours, 30 milliliters of aqueous 2.85% synthetic DL-alpha-hydroxyglutaric acid solution were added, and the incubation was continued for 1 hour. The cells were then harvested in a centrifuge, and were washed with water, resuspended in saline solution, and stored in a refrigerator. The suspension thus obtained contained 73 mg./ml. of cells, dry weight.

A medium was prepared having the following composition:

|  | Ml. |
|---|---|
| Aq. 2.85% DL-alpha-hydroxyglutaric acid solution | 8.0 |
| $(NH_4)_2HPO_4$ solution, 1 M | 2.5 |
| $MnSO_4$ solution, $10^{-3}$ M | 0.15 |
| Phosphate buffer, 0.1 M, pH 7.6 | 9.35 |
| Cell suspension | 10.0 |

The medium was placed in a 50-milliliter flask, stoppered lightly, and shaken for 19 hours in a water bath at 44° C. At the end of this time, it was found to have a pH of 7.32 and an L-glutamic acid content of 1.60 mg./ml., compared with an initial content of 0.33 mg./ml. This corresponds to a conversion of 13.9%, based upon the total DL-alpha-hydroxyglutaric acid values in the fermentation medium.

The foregoing examples are intended only to illustrate and to clarify the invention, and in no respect as a limitation upon the scope thereof. Numerous modifications, equivalents, and alternative procedures, materials, and conditions will be apparent from the foregoing description to those skilled in the art.

In accordance with the foregoing description, we claim as our invention:

1. A process for preparing L-glutamic acid which comprises aerobically fermenting a substance selected from the group consisting of L-alpha-hydroxyglutarate and substances affording L-alpha-hydroxyglutarate under the fermentation conditions in aqueous admixture with a nitrogen source comprising essentially a substance selected from the group consisting of ammonia, ammonium salts, and urea and a biological catalytic system produced by a microorganism selected from a genus of the group consisting of Pseudomonas and Aeromonas at a temperature at least about 5° C. above the optimum growth temperature of said microorganism.

2. The process of claim 1 wherein said fermentation is carried out at a temperature below about 60° C. and at least about 10° C. above the optimum growth temperature of said microorganism.

3. A process for preparing L-glutamic acid which comprises aerobically fermenting L-alpha-hydroxyglutarate and a nitrogen source comprising essentially a substance selected from the group consisting of ammonia, ammonium salts, and urea in aqueous solution in admixture with a microorganism selected from a genus of the group consisting of Pseudomonas and Aeromonas at a temperature between about 40 and about 60° C.

4. A process for producing L-glutamic acid which comprises aerobically fermenting an aqueous solution of a substance selected from the group consisting of DL-alpha-hydroxyglutarate and substances affording L-alpha-hydroxyglutarate under the fermentation conditions in admixture with a nitrogen source comprising essentially a substance selected from the group consisting of ammonia, ammonium salts, and urea and a microorganism selected from a genus of the group consisting of Pseudomonas and Aeromonas at a temperature between about 40 and about 60° C.

5. A process for producing L-glutamic acid which comprises aerobically fermenting L-alpha-hydroxyglutarate and a nitrogen source comprising essentially an ammonium salt in aqueous solution in admixture with a microorganism of the genus Pseudomonas at a temperature between about 40 and about 50° C.

6. A process for producing L-glutamic acid which comprises aerobically fermenting L-alpha-hydroxyglutarate and a nitrogen source comprising essentially an ammonium salt in aqueous solution in admixture with a microorganism of the genus Aeromonas at a temperature between about 40 and about 50° C.

7. A process for producing L-glutamic acid which comprises aerobically fermenting an aqueous mixture containing L-alpha-hydroxyglutarate, L-alpha-hydroxyglutaric acid lactone, a nitrogen source comprising essentially an ammonium salt, and a microorganism of the genus Pseudomonas at a temperature between about 40 and about 50° C. and at a pH between about 6 and about 9 for a period of about 5 to about 25 hours, and recovering L-glutamic acid from the fermentation product.

8. A process as in claim 7 wherein the microorganisms are subjected to pre-activation by growing in a culture medium containing L-alpha-hydroxyglutarate.

9. A process for producing L-glutamic acid which comprises aerobically fermenting an aqueous mixture containing L-alpha-hydroxyglutarate, L-alpha-hydroxyglutaric acid lactone, a nitrogen source, comprising essentially an ammonium salt and a microorganism of the genus Aeromonas at a temperature between about 40 and about 50° C. and a pH between about 6 and about 9 for a period of about 5 to about 25 hours, and recovering L-glutamic acid from the fermentation product.

10. A process as in claim 9 wherein the microorganisms are subjected to pre-activation by growing in a culture medium containing L-alpha-hydroxyglutarate.

11. A process for preparing L-glutamic acid which comprises aerobically fermenting a substance selected from the group consisting of L-alpha-hydroxyglutarate and substances affording L-alpha-hydroxyglutarate under the fermentation conditions in an aqueous medium comprising said substance, a nitrogen source comprising essentially a substance selected from the group consisting of ammonia, ammonium salts, and urea, phosphate, a metallic ion enzyme activator, and a microorganism selected from a genus of the group consisting of Pseudomonas and Aeromonas at a temperature between about 40 and about 60° C. and a pH between about 6 and about 9 for a period of about 5 to about 25 hours, and recovering L-glutamic acid from the fermentation product.

References Cited in the file of this patent

UNITED STATES PATENTS 2,749,279   Smythe et al. _____ June 5, 1956

OTHER REFERENCES

J. Biol. Chem., vol. 187 (1950), pp. 821 to 830.